(12) United States Patent
Kim et al.

(10) Patent No.: US 9,988,015 B2
(45) Date of Patent: Jun. 5, 2018

(54) APPARATUS FOR CUTTING OFF DARK CURRENT, VEHICLE COMPRISING THE SAME, AND METHOD FOR CONTROLLING THE SAME

(71) Applicant: HYUNDAI MOTOR COMPANY, Seoul (KR)

(72) Inventors: Woo Kuen Kim, Seoul (KR); Jin Gu Kwon, Seoul (KR); Myoung Soo Park, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days. days.

(21) Appl. No.: 15/354,415

(22) Filed: Nov. 17, 2016

(65) Prior Publication Data

US 2018/0022313 A1   Jan. 25, 2018

(30) Foreign Application Priority Data

Jul. 22, 2016   (KR) .................. 10-2016-0093615

(51) Int. Cl.
| G07C 9/00 | (2006.01) |
| B60R 25/24 | (2013.01) |
| B60R 16/03 | (2006.01) |

(52) U.S. Cl.
CPC .............. *B60R 25/24* (2013.01); *B60R 16/03* (2013.01); *G07C 9/00309* (2013.01); *G07C 9/00896* (2013.01); *G07C 2009/00769* (2013.01)

(58) Field of Classification Search
CPC .............. G07C 9/00182; G07C 9/0086; G07C 9/00309

USPC ........................................................ 340/5.6
See application file for complete search history.

(56) References Cited

U.S. PATENT DOCUMENTS

| 6,275,141 B1 | 8/2001 | Walter | |
| 2006/0114100 A1* | 6/2006 | Ghabra | E05B 81/78 |
| | | | 340/5.61 |
| 2012/0065839 A1* | 3/2012 | Makino | H04L 12/12 |
| | | | 701/36 |
| 2014/0324250 A1 | 10/2014 | Tomita et al. | |
| 2015/0022317 A1 | 1/2015 | Lange et al. | |

FOREIGN PATENT DOCUMENTS

| JP | 2010-053632 A | 3/2010 |
| JP | 2016-43794 A | 4/2016 |
| JP | 2016-73068 A | 5/2016 |
| KR | 10-2010-0116447 A | 11/2010 |

(Continued)

*Primary Examiner* — Vernal Brown
(74) *Attorney, Agent, or Firm* — Brinks Gilson & Lione

(57) ABSTRACT

An apparatus for cutting off dark current, and a method of controlling the apparatus are provided. The apparatus for cutting off dark current includes: a communicator to receive an input signal of a remote keyless entry (RKE) remote control from a body control module (BCM); a controller to determine whether the received input signal of the RKE remote control satisfies conditions for changing a dark current control mode of the apparatus, and to send out a control signal to change the dark current control mode upon determination that the input signal of the RKE remote control satisfies the conditions for changing the dark current control mode; and a switch to maintain the changed dark current control mode based on the sent out control signal.

14 Claims, 6 Drawing Sheets

(56) References Cited

FOREIGN PATENT DOCUMENTS

| KR | 10-1315773 B1 | 10/2013 |
| KR | 10-2014-0051662 A | 5/2014 |
| KR | 10-2015-0065407 A | 6/2015 |

\* cited by examiner

APPARATUS FOR CUTTING OFF DARK CURRENT, VEHICLE COMPRISING THE SAME, AND METHOD FOR CONTROLLING THE SAME

CROSS-REFERENCE TO RELATED APPLICATION

This application claims priority to and the benefit of Korean Patent Application No. 10-2016-0093615, filed on Jul. 22, 2016, which is incorporated herein by reference in its entirety.

FIELD

The present disclosure relate to apparatuses for cutting off dark current, vehicles including the same, and method of controlling the apparatuses for cutting off dark current.

BACKGROUND

The statements in this section merely provide background information related to the present disclosure and may not constitute prior art.

Vehicles are machines that transport people or cargo to a destination while travelling on roads or railways. A vehicle may travel to various locations using at least one wheel mounted on a body of the vehicle. Examples of the vehicle may include three-wheeled or four-wheeled automobiles, two-wheelers such as motorcycles, construction machines, bicycles, and trains running on railways.

In general, vehicles are provided with a circuit used to lock or unlock doors by operating actuators in accordance with a mechanical control of a key by a driver via a key hole. Recently, a remote keyless entry (RKE) system has been provided to automatically open the doors when the driver is located within a predetermined distance from the vehicle without separate manipulation of the key.

Also, a junction box has been widely used in the vehicle to provide battery power to various electrical devices consuming electricity and installed in the vehicle such as lamps, body electrical parts, multimedia devices, and motor driving devices. A plurality of fuses used to inhibit or prevent application of overcurrent and overload to an external circuit or relays to supply or cut off power. Since various electrical devices using the battery power are connected to the junction box, a technique to cut off dark current consumed by these electrical devices has been applied thereto.

Dark current cutoff apparatuses (power connectors), which inhibit or prevent battery discharge caused by dark current by using a mode switch and a switching device, have been applied to recently developed smart junction boxes (SJB).

SUMMARY

The present disclosure provides an apparatus for cutting off dark current by changing a dark current control mode using a remote keyless entry (RKE) signal or the number of ignition On/Off switching cycles without using a switch.

In accordance with one aspect of the present disclosure, an apparatus for cutting off dark current includes: a communicator configured to receive an input signal of a remote keyless entry (RKE) remote control from a body control module (BCM); a controller configured to determine whether the received input signal of the RKE remote control satisfies conditions for changing a dark current control mode of the apparatus for cutting off dark current, and to send out a control signal to change the dark current control mode upon determination that the input signal of the RKE remote control satisfies the conditions for changing the dark current control mode; and a switch configured to maintain the changed dark current control mode based on the sent out control signal.

The controller may send out the control signal to change the dark current control mode of the apparatus for cutting off dark current when the input signal of the RKE remote control is a vehicle unlocking input signal, and the vehicle unlocking input signal is input for a predetermined time period.

The dark current control mode of the apparatus for cutting off dark current may include: a first mode in which only load devices related to ignition of a vehicle consume power before the vehicle is delivered to a user; and a second mode in which the power is used or consumed by the other load devices as well as the load devices related to the ignition of the vehicle after the vehicle is delivered to the user.

The controller may change the dark current control mode of the apparatus from the first mode to the second mode when the input signal of the RKE remote control satisfies the conditions for changing the dark current control mode.

The controller may determine whether the dark current control mode of the apparatus is changed, and change the dark current control mode based on the number of ignition On/Off switching cycles of the vehicle upon determination that the dark current control mode of the apparatus for cutting off dark current is not changed by the sent out signal to change the dark current control mode.

The controller may change the dark current control mode when the number of ignition On/Off switching cycles of the vehicle is greater than a predetermined number of times.

The switch may include a toggle switch configured to maintain the changed second mode.

The controller is configured to determine whether the ignition of the vehicle is on and whether the RKE remote control is located in the vehicle.

In another form, a method of controlling an apparatus for cutting off dark current may include: receiving, by a controller, an input signal of a remote keyless entry (RKE) remote control from a body control module; determining, by the controller, whether the received input signal of the RKE remote control satisfies conditions for changing a dark current control mode of the apparatus for cutting off dark current; and sending out, by the controller, a control signal to change the dark current control mode upon determination that the input signal of the RKE remote control satisfies the conditions for changing the dark current control mode.

The changed dark current control mode may be maintained based on the sent out control signal to change the dark current control mode.

The control signal to change the dark current control mode of the apparatus for cutting off dark current may be sent out when the received input signal of the RKE remote control is a vehicle unlocking input signal, and the vehicle unlocking input signal is input for a predetermined time period.

The dark current control mode of the apparatus for cutting off dark current may include: a first mode in which only load devices related to ignition of a vehicle consume power before the vehicle is delivered to a user; and a second mode in which the power is consumed by other load devices as well as the load devices related to the ignition of the vehicle after the vehicle is delivered to the user.

The dark current control mode of the apparatus for cutting off dark current may be changed from the first mode to the second mode when the input signal of the RKE remote control satisfies the conditions for changing the dark current control mode.

The method of controlling the apparatus for cutting off dark current may further include: determining, by the controller, whether the dark current control mode of the apparatus for cutting off dark current is changed; and changing, by the controller, the dark current control mode based on the number of ignition On/Off switching cycles of the vehicle when the dark current control mode is not changed by the sent out control signal to change the dark current control mode.

The dark current control mode may be changed when the number of ignition On/Off switching cycles of the vehicle is greater than a predetermined number of times.

The maintaining of the changed dark current control mode may be performed by maintaining the changed second mode.

The method of controlling the apparatus for cutting off dark current may further include: determining, by the controller, whether ignition of the vehicle is on; and determining, by the controller, whether the RKE remote control is located in the vehicle.

A vehicle may include any one of the apparatus for cutting off dark current.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
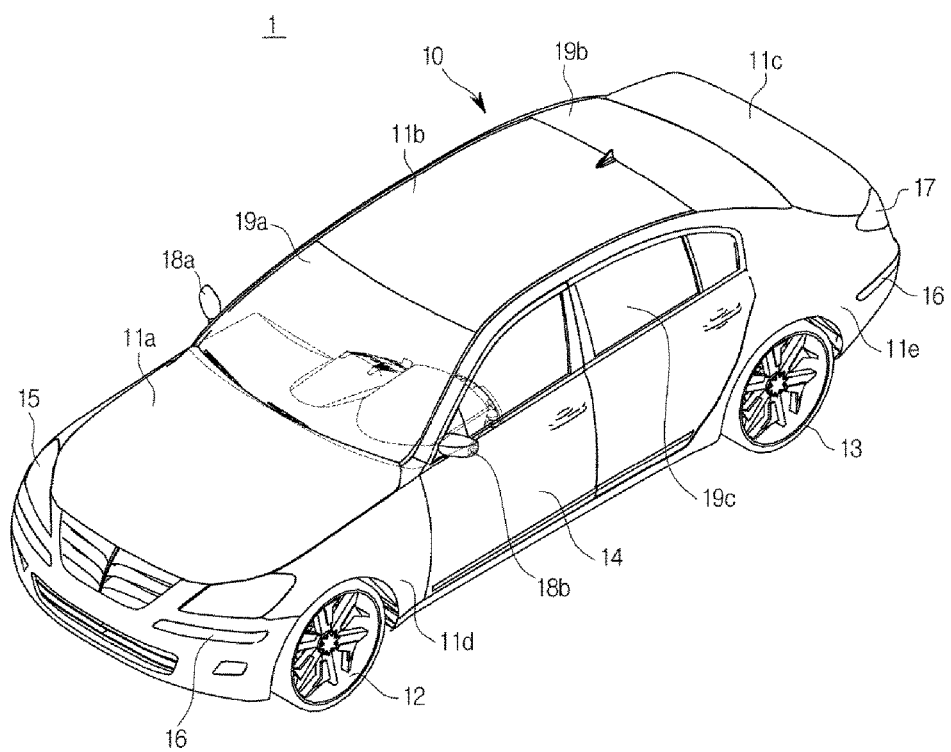
FIG. 1 is a perspective view illustrating an exterior appearance of a vehicle provided with an apparatus for cutting off dark current.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure may be embodied in many different forms and should not be construed as being limited to the forms set forth herein; rather, these forms are provided so that this disclosure will be thorough and complete, and will fully convey the concept of the disclosure to those of ordinary skill in the art.

The terms used in the present disclosure will be described briefly, and then forms will be described in detail.

The terms used in the present disclosure are selected from currently widely used general terms in consideration of functions of the present disclosure, but may vary according to the intentions or practices of those skilled in the art or the advent of new technology. Additionally, in certain cases, there may be terms that an applicant may arbitrarily select, and in this case, their meanings are described below. Accordingly, the terms used in the present disclosure should be interpreted on the basis of substantial implications that the terms have and the contents across the present disclosure not the simple names of the terms.

Throughout the present disclosure, the term "comprising" do not preclude the other elements but further includes an element unless otherwise stated. In addition, the term "unit" as used herein, refers to, but is not limited to, a software component or a hardware component such as a FPGA or ASIC and performs certain tasks. A unit may be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

Hereinafter, an apparatus for cutting off dart current, a vehicle including the same, and a method of controlling the apparatus will be described in detail by explaining exemplary forms of the present disclosure with reference to the attached drawings. In the drawings, parts unrelated to the descriptions are omitted for clear description of the disclosure.

FIG. 1 is a perspective view illustrating an exterior appearance of a vehicle provided with an apparatus for cutting off dark current according to one form.

Referring to FIG. 1, a vehicle 1 may include a body 10 defining an appearance of the vehicle 1 and wheels 12 and 13 configured to move the vehicle 1.

The body 10 may include a hood 11a configured to protect various devices desired to drive the vehicle 1 such as an engine, a motor, a battery, and a transmission lever, a roof panel 11b forming an indoor space, a trunk lid 11c defining an accommodation space, and fenders 11d and quarter panels 11e provided at sides of the vehicle 1. In addition, a plurality of doors 14 is rotatably hinged to the sides of the body 11.

A front window 19a is provided between the hood 11a and the roof panel 11b to provide views in front of the vehicle 1, and a rear window 19b is provided between the roof panel 11b and the trunk lid 11c to provide views behind the vehicle 1. Also, side windows 19c are provided at upper positions of the doors 15 to provide side views.

Headlamps 15 may also be provided at front portions of the vehicle 1 to emit light in a proceeding direction the vehicle 1.

Also, turn signal lamps 16 may be provided at front and rear portions of the vehicle 1 to indicate the proceeding direction of the vehicle 1.

The vehicle 1 may indicate the proceeding direction by turning on the turn signal lamps 16. Tail lamps 17 are also provided at rear positions of the vehicle 1. The tail lamps 17 may indicate a gear level and an operation state of a brake of the vehicle 1 at the rear portions of the vehicle 1.

An exterior of the body may further include side mirrors 18a and 18b configured to provide a driver with a view behind the vehicle 1.

An electric vehicle 1 may include an engine, a motor, a battery, and a transmission. In this case, the controller 160 may supply driving power to the vehicle 1 by controlling states of the engine, motor, and transmission by communicating with a battery controller (not shown) via a controller area network (CAN).

Figure 2:
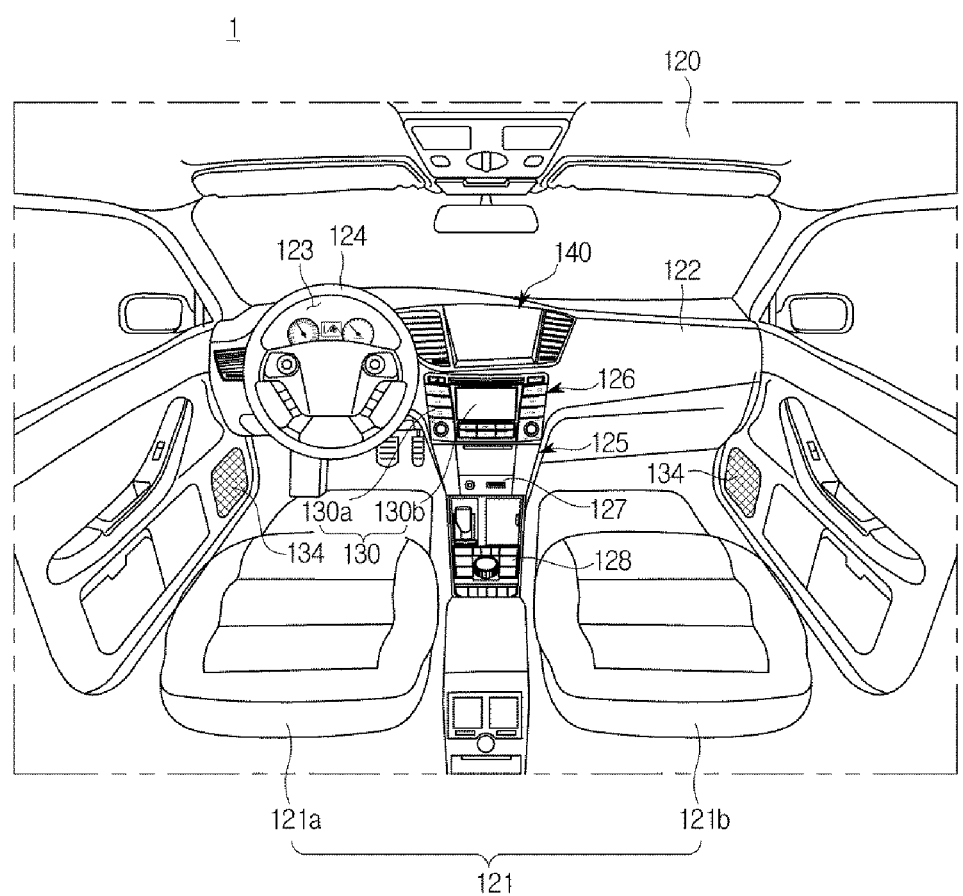
FIG. 2 is an interior view of an apparatus for cutting off dark current.

FIG. 2 is an interior view of an apparatus for cutting off dark current according to one form.

As illustrated in FIG. 2, an interior 120 of the body includes seats 121 on which passengers sit, a dashboard 122, and an instrument cluster 123 including a tacometer, a speedometer, a coolant thermometer, a turn signal indicator light, a high beam indicator light, a warning light, a seat belt warning light, a trip meter, an odometer, an automatic transmission selection indicator light, a door open warning light, an engine oil warning light, and a low fuel warning light, a steering wheel 124 configured to manipulate direction of the vehicle 1, and a center fascia 125 provided with vents and a control panel of an air conditioner and an audio device, which are disposed on the dashboard 122.

The seats 121 includes a driver's seat 121a, a front passenger's seat 121b, and back seats located at the rear of the vehicle 1.

The instrument cluster 123 may be implemented as a digital type. That is, the digital type instrument cluster 123 may display information about the vehicle 1 and driving-related information as images and an available driving distance of the vehicle 1 calculated based on a battery current capacity.

The center fascia 125 is located at the dashboard 122 between the driver's seat 121a and the front passenger's seat 121b.

The center fascia 125 may be provided with a head unit to control the air conditioner and a heater.

The head unit 126 may include various buttons used to control the air conditioner and the heater.

A controller to control the air conditioner and the heater may be disposed in the head unit 126.

The head unit 126 may include an audio device 130 configured to perform radio functions, an input unit 130a configured to receive a command to operate the audio device 130, and a display unit 130b configured to display operation information thereof. In this regard, the audio device 130 provided in the vehicle 1 may be a head unit having radio functions or an audio video navigation (AVN) terminal for vehicles having radio functions.

The audio device 130 may receive broadcast signals and output a broadcast. FIG. 2 exemplarily illustrates that the audio device 130 is disposed in the center fascia 125, and a speaker 134 configured to output the broadcast upon receiving the broadcast signals from the audio device 130 may be installed at a front door of the vehicle 1. However, the position of the speaker 134 illustrated in FIG. 2 is an example, and the speaker 134 may be installed at any position in the vehicle 1.

In this case, the display unit 130b may display operation information of the air conditioner and the heater. Also, the display unit 130b may display an interface created with regard to operation of the vehicle 1 or an interface created related to the available driving distance of the vehicle 1.

The center fascia 125 may be provided with vents, a cigar jack, and the like. In addition, the center fascia 125 may be provided with a multi-port 127 to which an external device including a terminal (not shown) of a user is connected using a cable.

That is, the multi-port 127 may allow wired communication between the head unit 126 or a vehicle terminal 140 and a user terminal (not shown).

In this case, the multi-port 127 may include a USB port and an AUX port, and may further include an SD slot. The multi-port 127 may be disposed adjacent to the head unit 126 and the vehicle terminal 140 and electrically connected to the vehicle terminal 140 and the external device via a connector or cable.

The external device may include a storage device, a user terminal, an MP3 player, and the like, and the storage device may include a card-type memory or an external hard disc drive.

Also, the user terminal included in the external device is a mobile communication terminal such as a smart phone, a notebook computer, and a tablet. The vehicle 1 may further include a manipulation unit 128 configured to receive commands to operate various functions.

The manipulation unit 128 may be disposed at the head unit 126 and the center fascia 125 and include at least one physical button such as On/Off buttons to operate various functions and buttons to change settings of the various functions. The manipulation unit 128 may transmit manipulation signals of the buttons to a controller of the head unit 126 or the vehicle terminal 140.

That is, the manipulation unit 128 may receive a command to turn on and off operation of the vehicle terminal 140, receive at least one selected function among a plurality of functions, and transmit the selected function to the vehicle terminal 140.

For example, the manipulation unit 128 receives input information about a destination and transmits the input information to the vehicle terminal 140 when a navigation function is selected, receives input broadcasting channel and volume information and transmits the input broadcasting channel and volume information to the vehicle terminal 140 when a digital media broadcasting (DMB) function is selected, and receives input radio channel and radio volume information and transmits the input radio channel and radio volume information to the vehicle terminal 140 when a radio function is selected.

The manipulation unit 128 may include a touch panel integrated with a display unit of the vehicle terminal 140. The manipulation unit 128 may be displayed on the display unit of the vehicle terminal 140 in the form of an activated button and receive input location information of the displayed button.

The manipulation unit 128 may further include a jog dial (not shown) or a touch pad to input a command to move a cursor displayed on the display unit of the vehicle terminal 140 and a command to select the function. The manipulation unit 128 may transmit a manipulation signal of the jog dial or a touch signal of the touch pad to the vehicle terminal 140.

In this case, the jog dial or the touch pad may be disposed at the center fascia, or the like. The manipulation unit 128 may also receive a command to automatically change channels while the radio function is performed.

Also, the user may input a control command to change a driving mode of the vehicle 1 via the manipulation unit 128 or a control comment to control various components of the vehicle 1.

The display unit 130b displays operation information of the head unit 126 and information input to the manipulation unit 128.

For example, the display unit 130b displays information about radio channel and radio volume input by the user when the radio function is selected.

The display unit 130b may display input information of the command to automatically change channels and information about performance of automatically changing the channels while the radio function is performed.

The vehicle terminal 140 may be mounted on the dashboard 122.

The vehicle terminal 140 performs audio functions, video functions, navigation functions, DMB functions, radio functions, and GPS receiving functions.

A frame of the vehicle 1 includes a power generation apparatus, a power transmission apparatus, a driving apparatus, a steering apparatus, a brake apparatus, a suspension apparatus, a transmission apparatus, a fuel supply apparatus, left/right front and rear wheels, and the like.

The vehicle 1 may also be provided with various safety apparatuses for the safety of the driver and passengers.

Examples of the safety apparatus of the vehicle 1 include an airbag control apparatus for the purpose of safety of the driver and passengers in a collision of the vehicle 1 and an electronic stability control (ESD) apparatus to control a balance of the vehicle 1 during acceleration or cornering.

The vehicle 1 may further include sensing apparatuses such as a proximity sensor to detect obstacles or another vehicle present at lateral sides and a rear side of the vehicle, a rain sensor to sense an event of rain and rainfall, a wheel speed sensor disposed at each wheel, an acceleration sensor to sense acceleration of the vehicle 1, and an angular velocity sensor to sense steering angles.

The vehicle 1 may also include an electronic control unit (ECU) to control operation of the power generation apparatus, the power transmission apparatus, the driving apparatus, the steering apparatus, the brake apparatus, the suspension apparatus, the transmission apparatus, the fuel supply apparatus, a battery control apparatus, various safety apparatus, and various sensing apparatuses.

The vehicle 1 may further include electronic devices installed for the convenience of the driver, such as a hands-free device, a Bluetooth device, a rear view camera, a charging device for the user terminal, and a high pass device.

The vehicle 1 may further include a starter button to input a command to operate a starter motor (not shown).

That is, when the starter button is turned on, the vehicle 1 operates the starter motor (not shown) and drives an engine (not shown) that is a power generation apparatus via operation of the starter motor.

The vehicle 1 may include a battery (not shown) electrically connected to a terminal device, an audio device, an interior light, a starter motor, and other electronic devices to supply driving power thereto.

An electric vehicle 1 includes a battery for driving and runs by charging the battery and driving a motor using charged electricity. The battery performs charge using a self-power generator or power of the engine while driving or at an electric charging station before driving.

The vehicle 1 may further include a communication device for communication within various electronic devices installed therein and communication with the external terminal such as the user terminal.

The communication device may include a control area network (CAN) communication module, a wireless fidelity (WiFi) communication module, a USB communication module, and a Bluetooth communication module. The communication device may further include a broadcasting communication module, for example, SXM, RDS and TPEG such as DMB.

Figure 3:
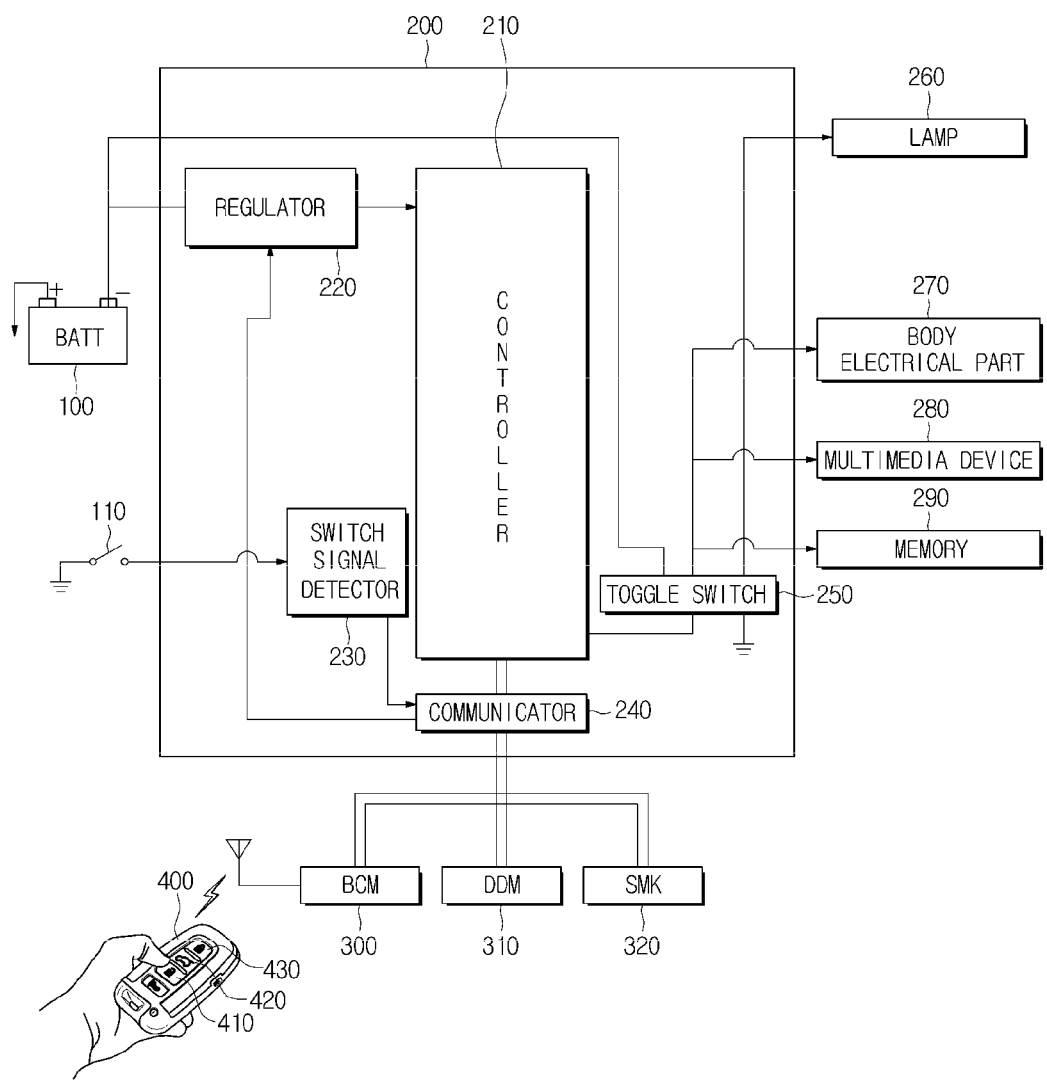
FIG. 3 is a control block diagram illustrating an apparatus for cutting off dark current.

FIG. 3 is a control block diagram illustrating an apparatus for cutting off dark current according to one form.

Dark current refers to current of electricity consumed by various load devices using battery power even after the vehicle 1 is powered off. In an electrical device operating by electricity, power related to basic operation of the electric device is generally cut off when a system is powered off. However current is continuously supplied to the electrical device in order to immediately start operation when the system is powered next time and supplied to various controllers to continuously perform the basic operation of the electric device. Such current is referred to as the dark current.

When ignition of the vehicle 1 is off, the flow of current supplied from the battery to various accessory devices such as the starter device and the radio is cut off. However, current is continuously supplied from the battery into devices used for immediate ignition or other controllers.

If delivery of the vehicle 1 to the customer from manufacturing takes a long time by customs clearance, delivery process, and the like, or the vehicle 1 does not run for a long time by exporting, long term storage, or parking, the risk of battery discharge increases due to dark current which always flows in load devices of the vehicle 1 using B+ power (digital clock, room lamp, emergency lamp, and the like).

In order to inhibit or prevent the battery discharge, a switch (pre-delivery mode/post-delivery mode) is controlled such that load device operation is minimized before delivery of the vehicle 1 to the customer. For example, only electrical parts related to the ignition of the vehicle 1 (engine ECU, remoter starting, and the like) operate using standby power under power-off conditions before delivery of the vehicle 1 to the customer to reduce battery discharge. After delivery of the vehicle 1, the switch is controlled such that various accessory load devices (audio, and the like) also use standby power. On the contrary, when the vehicle 1 is delivered to the customer, a mode switch is turned on to normally supply battery power to the load devices installed in the vehicle 1.

In smart junction boxes (SJB), dark current cutoff apparatuses (power connectors) using a mode switch and a switching device are used to inhibit or prevent battery discharge caused by dark current. However, it is inconvenient for a user or a dealer of the vehicle 1 to manually change a mode of the dark current cutoff apparatus from a pre-delivery mode to a post-delivery mode via switch manipulation. Also, we have discovered that the dark current cutoff apparatuses cannot be manufactured with small size due to the switch.

Thus, an apparatus for cutting off dark current 200 of a smart junction box according to the present disclosure may remove conventional mode switches and relays and automatically change a dark current control mode.

Although the apparatus for cutting off dark current 200 may also be applied to an In-Panel Module, ICU, and the like, in addition to the smart junction box, the apparatus for cutting off dark current 200 applied to the smart junction box will be exemplarily described hereinafter.

Referring to FIG. 3 the apparatus for cutting off dark current 200 may include a controller 210 configured to control the overall operation of the apparatus for cutting off dark current 200, such as supplying and cutting off battery power. The controller 210 may be connected to another module installed in the vehicle 1 by a communicator 240 enabling CAN communication.

Examples of the module installed in the vehicle 1 may include a plurality of modules such as a body control module (BCM) 300, a driver door module (DDM) 310, a smart key module (SMK) 320, an assist door module (ADM, not shown), and a cluster (not shown), without being limited thereto.

The apparatus for cutting off dark current 200 may further include: a regulator 220 configured to control battery power into the controller 210; and a switch signal detector 230 configured to detect an On/Off signal of a local switch 110. The local switch 110 may control opening and closing states of the door and the trunk lid as well as On/Off states of ignition of the vehicle 1. The controller 210 may recognize an ignition On/Off states of the vehicle 1 based on signals from the switch signal detector 230.

Although not shown in FIG. 3, the apparatus for cutting off dark current 200 may include a switching device used to supply power to load devices of the vehicle 1. When the switching device is turned on by the controller 210, power may be supplied to the load devices of the vehicle 1 such as a lamp 260, body electrical parts 270, a multimedia device 280 such as the audio device or AVN device, and a memory 290. On the contrary, when the switching device is turned off, the power supplied to the load devices is cut off.

The controller 210 may be implemented using a plurality of logic gates or a combination of a universal microprocessor and a memory in which programs executable by the microprocessor are stored.

The communicator 240 may communicate with various components included in the vehicle 1 via CAN. A communication module included in the communicator 240 may be a Bluetooth communication module, a wireless fidelity (WiFi) communication module accessing a local area network (LAN) via wireless access points, and a Zigbee communication module, without being limited thereto, and any other communication module performing communication in accordance with various communication protocols may also be used.

The apparatus for cutting off dark current 200 may include a toggle switch 250. The toggle switch 250 starts operation after power is supplied thereto once, and an operation state thereof is maintained after operation is started. The toggle switch 250 may supply normal power to the load devices of the vehicle 1 after the control mode of the apparatus for cutting off dark current 200 is changed to a post-delivery mode, which will be described later.

Hereinafter, a method of controlling an apparatus for cutting off a dark current will be described with reference to FIGS. 3 to 6.

Figure 4:
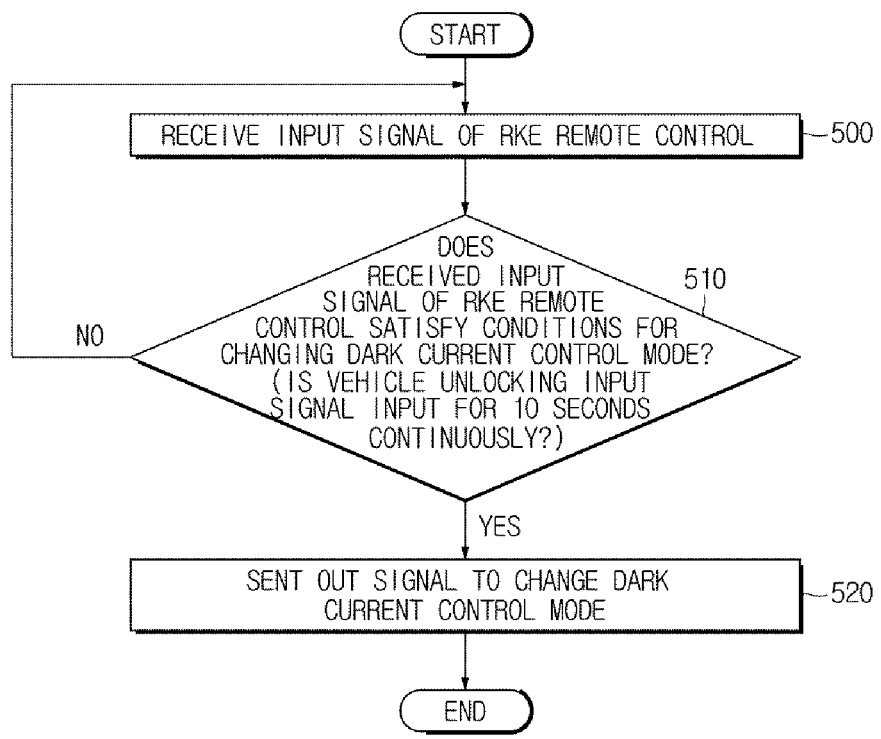
FIGS. 4 to 5 are flowcharts illustrating methods of changing dark current control mode based on an input signal of a remote keyless entry (RKE) remote control.
Figure 5:
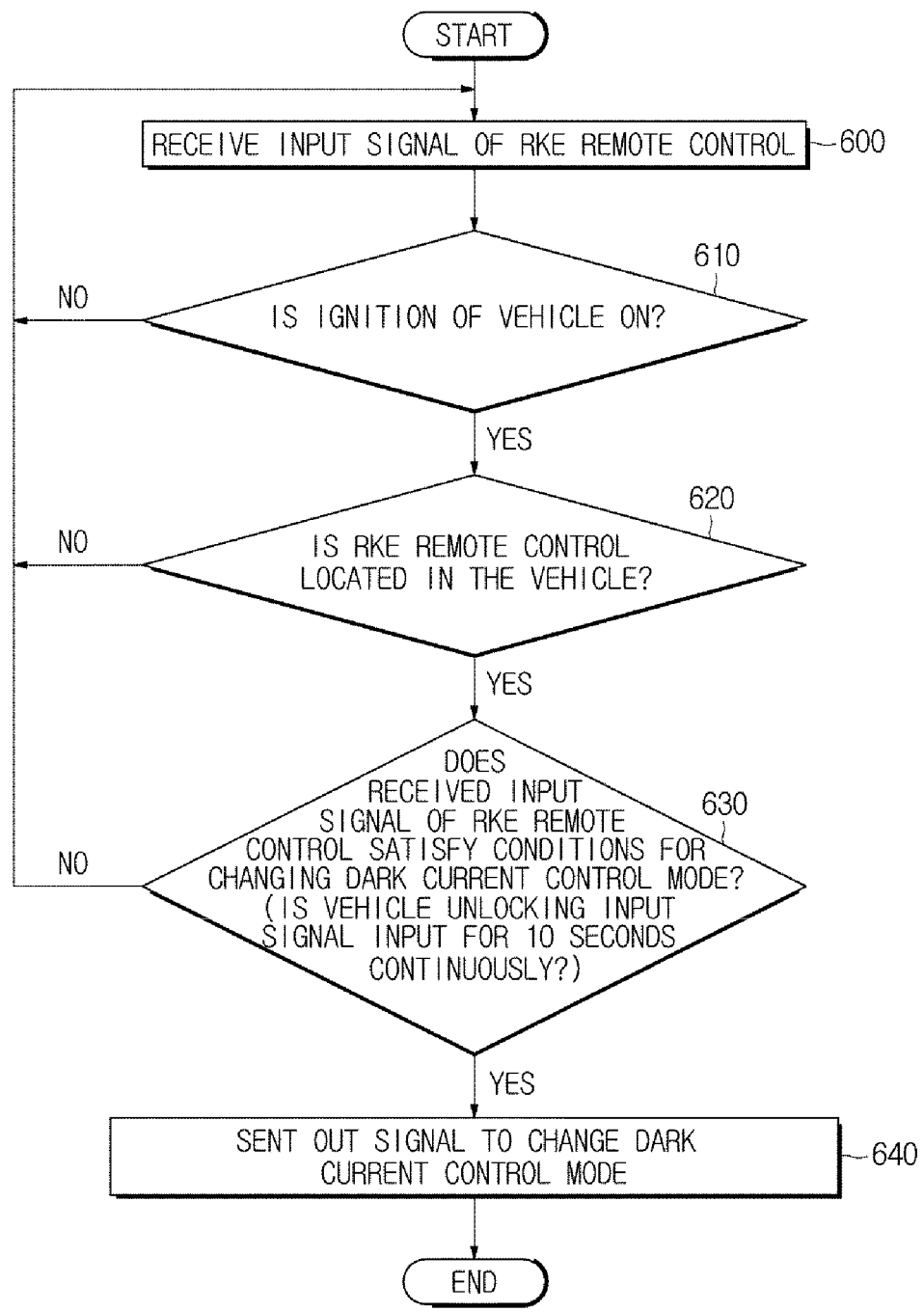

FIGS. 4 to 5 are flowcharts illustrating methods of changing dark current control mode based on an input signal of a remote keyless entry (RKE) remote control according to one form.

Referring to FIG. 4, the communicator 240 of the apparatus for cutting off dark current 200 may receive an input signal of an RKE remote control 400 (500). Referring to FIG. 3, the user may input a control signal via the RKE remote control 400, and the input control signal is received by the BCM 300 and transmitted to the controller 210 via the communicator 240. Although not shown in FIG. 3, the BCM 300 may include an RF receiving unit (not shown) configured to receive a signal from the RKE remote control 400.

The RKE remote control 400 may include a plurality of input buttons, and the user may input a control signal via one of the plurality of input buttons. As illustrated in FIG. 3, the plurality of input buttons includes a vehicle unlocking button 410, a trunk unlocking button 420, and a vehicle locking button 430, and the user may input a vehicle unlocking signal via the vehicle unlocking button 410.

The controller 210 may determine whether the input signal of the RKE remote control 400 received via the communicator 240 satisfies conditions for changing the dark current control mode of the apparatus for cutting off dark current 200 (510).

The conditions for changing the dark current control mode of the apparatus for cutting off dark current 200 may be set in various ways. According to one form, the conditions may be set such that the input signal of the RKE remote control 400 is a vehicle unlocking input signal, and the vehicle unlocking input signal is input for a predetermined time period. That is, when the user maintains inputting of the vehicle unlocking signal via the vehicle unlocking button 410 of the RKE remote control 400 for approximately 10 seconds continuously, the controller 210 may recognize the signal as an input signal satisfying the conditions for changing the dark current control mode.

Although the input time of the vehicle unlocking signal is exemplarily described as 10 seconds, the signal input time may vary according to forms.

Upon determination that the input signal of the RKE remote control 400 satisfies the conditions for changing the dark current control mode, the controller 210 may send out a signal to change the dark current control mode (520). The dark current control mode includes 'pre-delivery mode' and 'post-delivery mode' as described above. Hereinafter, the 'pre-delivery mode' is referred to as 'first mode', and the 'post-delivery mode' is referred to as 'second mode', for descriptive convenience.

The first mode is a mode in which load devices such as electrical parts related to ignition of the vehicle 1 (engine ECU, remote starting, and the like) use standby power under power-off conditions before the vehicle 1 is delivered to the user. The second mode is a mode in which various accessory load devices (audio device and AVN device) as well as the load devices related to the ignition of the vehicle 1 use standby power after the vehicle 1 is delivered to the user.

The apparatus for cutting off dark current 200 may change the dark current control mode from the first mode to the second mode based on the signal to change the dark current control mode sent out by the controller 210. That is, the user or the dealer of the vehicle 1 does not need to manually change the dark current control mode after delivering the vehicle 1 to a customer. Instead, the user or the dealer of the vehicle 1 may change the dark current control mode more conveniently by simply inputting the vehicle unlocking signal for a predetermined time period via the RKE remote control 400.

When the controller 210 sends out the signal to change the dark current control mode, the dark current control mode of the apparatus for cutting off dark current 200 is changed into the second mode, and the toggle switch 250 may maintain the second mode as the dark current control mode based on the sent out signal. That is, when power is supplied to the toggle switch 250 once by the signal to change the dark current control mode, the operation state is maintained and normal power may be supplied to the load devices of the vehicle 1 in accordance with the second mode.

Referring to FIG. 5, the controller 210 may receive a vehicle unlocking input signal of the RKE remote control 400 (600) and determine whether the ignition of the vehicle 1 is on (610). That is, the controller 210 may recognize an ignition On/Off state of the vehicle 1 based on the signal from the switch signal detector 230.

Upon determination that the ignition of the vehicle 1 is on, the controller 210 may determine whether the RKE remote control 400 is located in the vehicle 1 (620). In order to determine whether the RKE remote control 400 is located in the vehicle 1, intensity of the signal, arrival distance thereof, or the like may be used. Besides, any other methods may be used to determine whether the RKE remote control 400 is located in the vehicle 1.

The input signal may be transmitted to the controller 210 via the RKE remote control 400 even when there is no intention to change the dark current control mode and the RKE remote control 400 is located outside the vehicle 1. Thus, the controller 210 may change the dark current control mode under designated conditions by additionally determining whether the ignition of the vehicle 1 is on and whether the RKE remote control 400 is located in the vehicle 1.

When the ignition of the vehicle 1 is on and the RKE remote control 400 is located in the vehicle 1 as a result of determination performed by the controller 210, the controller 210 may determine whether the input signal of the RKE remote control 400 received via the communicator 240 satisfies the conditions for dark current of the apparatus for cutting off dark current 200 (630).

Upon determination that the input signal of the RKE remote control 400 satisfies the conditions for changing the dark current control mode, the controller 210 may send out the signal to change the dark current control mode (640), and the apparatus for cutting off dark current 200 changes the dark current control mode from the first mode to the second mode based on the signal to change the dark current control mode sent out by the controller 210.

In addition, the toggle switch 250 may maintain the second mode as the dark current control mode based on the signal sent out by the controller 210. Descriptions thereof are described above with reference to FIG. 4 and will not be repeated.

Figure 6:
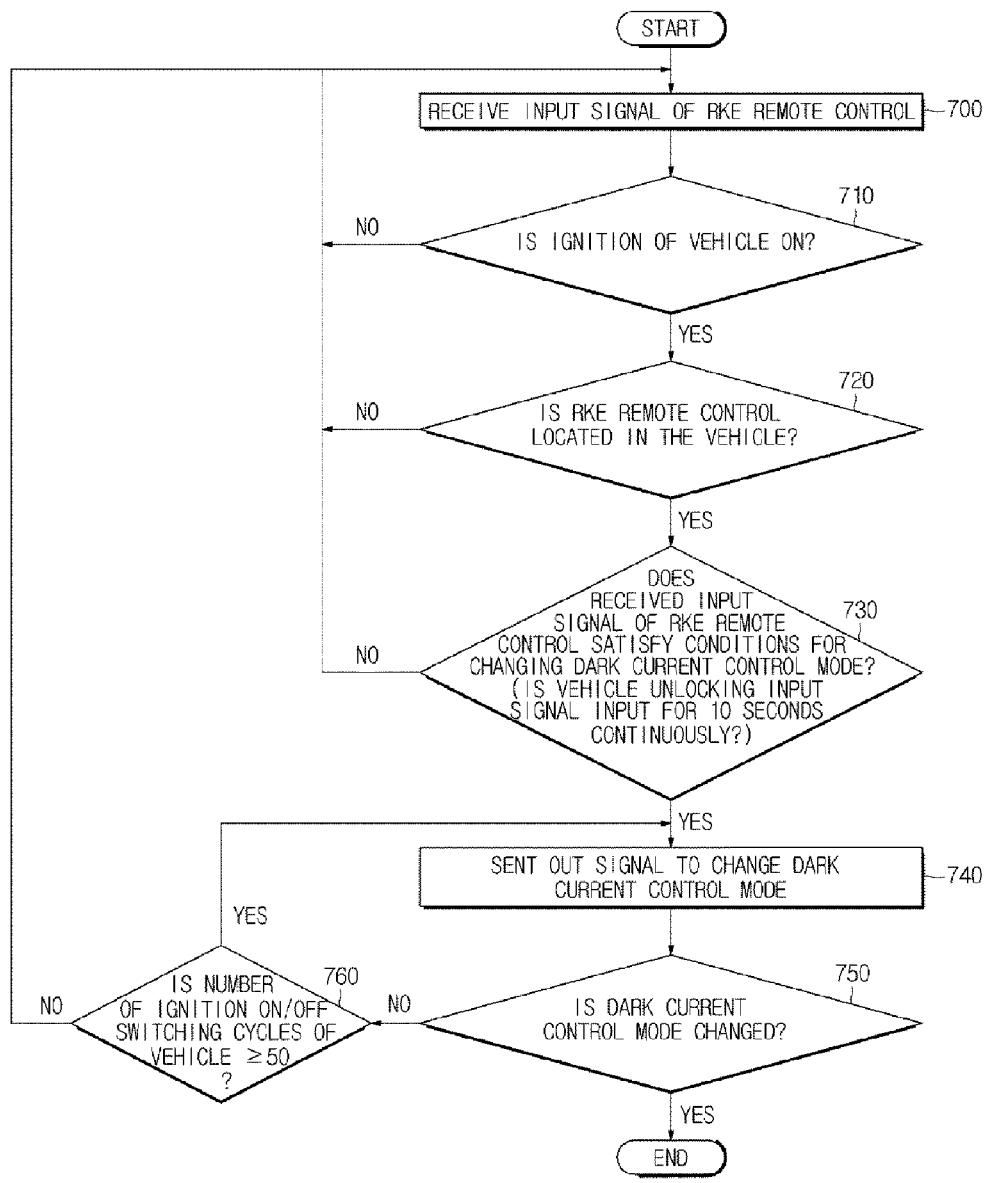
FIG. 6 is a flowchart for describing a method of changing a dark current control mode based on the number of ignition On/Off switching cycles of a vehicle.

FIG. 6 is a flowchart for describing a method of changing a dark current control mode based on the number of ignition On/Off switching cycles of a vehicle according to another form.

Referring to FIG. 6, the controller 210 may receive the vehicle unlocking input signal of the RKE remote control 400 as described above with reference to FIG. 5 (700) and determine whether the ignition of the vehicle 1 is on (710). Upon determination that the ignition of the vehicle 1 is on, the controller 210 may determine whether the RKE remote control 400 is located in the vehicle 1 (720).

Upon determination that the ignition of the vehicle 1 is on and the RKE remote control 400 is located in the vehicle 1, the controller 210 may determine whether the input signal of the RKE remote control 400 received via the communicator 240 satisfies conditions for changing the dark current control mode of the apparatus for cutting off dark current 200 (730).

Upon determination that the input signal of the RKE remote control 400 satisfies the conditions for changing the dark current control mode, the controller 210 may send out a signal to change the dark current control mode (740), and the apparatus for cutting off dark current 200 may change the dark current control mode from the first mode to the second mode based on the signal to change the dark current control mode sent out by the controller 210.

The controller 210 may determine whether the dark current control mode of the apparatus for cutting off dark current 200 is changed from the first mode to the second mode (750). If the dark current control mode is not changed even after the controller 210 sent out the signal to change the dark current control mode, the dark current control mode may be changed based on the number of ignition On/Off switching cycles of the vehicle 1.

That is, when the dark current control mode is not changed from the first mode to the second mode and the first mode is maintained even after the input signal of the RKE remote control 400 satisfied the conditions for changing the dark current control mode and the controller 210 sent out the signal to change the dark current control mode, the dark current control mode may be changed based on the number of ignition On/Off switching cycles of the vehicle 1.

Upon determination that the dark current control mode is not changed, the controller 210 may determine whether the number of ignition On/Off switching cycles of the vehicle 1 is greater than a predetermined number of times (760). Since the controller 210 recognizes the ignition On/Off states of the vehicle 1 based on signals from the signal detector 230, the controller 210 may also determine the number of ignition On/Off switching cycles of the vehicle 1.

According to one form, upon determination that the number of ignition On/Off switching cycles of the vehicle 1 is equal to a predetermined value (e.g., 50 times) or greater, the controller 210 may resend out a control signal to change the dark current control mode from the first mode to the second mode (740).

When the dark current control mode is set as the first mode even after the number of ignition On/Off switching cycles of the vehicle 1 is 50 times or greater, the dark current control mode is not normally changed by the signal sent out by the controller 210. Thus, the dark current control mode should be changed to the second mode. Although a desired number of ignition On/Off switching cycles detected by the controller 210 is exemplarily described as 50 times, the number of ignition On/Off switching cycles detected by the controller 210 may be variously set.

Thus, the controller 210 determines whether the dark current control mode is changed. If not changed, the controller 210 may re-change the dark current control mode to the second mode based on the number of ignition On/Off switching cycles. As a result, the dark current control mode may be changed to the second mode even when the changing of the dark current control mode is not normally performed due to defects or malfunctioning of the apparatus for cutting off dark current 200.

The dark current control mode of the apparatus for cutting off dark current 200 may be changed from the first mode to the second mode based on the signal to change the dark current control mode resent out by the controller 210, and the toggle switch 250 may maintain the second mode as the dark current control mode.

As is apparent from the above description, the size of the apparatus for cutting off dark current may be reduced by removing the physical switch to change the dark current control mode of the apparatus for cutting off dark current and the relays.

Also, since the dark current control mode is changed using the RKE signal, inconvenience of the user or the dealer of the vehicle caused by manually changing the dark current control mode may be reduced.

In addition, the dark current control mode may also be changed using the number of ignition On/Off switching cycles of the vehicle even when the dark current control mode is not changed by the RKE signal.

Although exemplary forms of the apparatus for cutting off dark current, the vehicle including the same, and the method of controlling the same are described, the scope of the present disclosure is not limited to the descriptions given above. It would be appreciated by those skilled in the art that changes may be made in these forms without departing from the principles and spirit of the present disclosure.

What is claimed is:

1. An apparatus for cutting off dark current comprising:
    a communicator configured to receive an input signal of a remote keyless entry (RKE) remote control from a body control module (BCM);
    a controller configured to determine whether the received input signal of the RKE remote control satisfies conditions for changing a dark current control mode of the apparatus for cutting off dark current, and to send out a control signal to change the dark current control mode upon a determination that the input signal of the RKE remote control satisfies the conditions for changing the dark current control mode; and
    a switch configured to maintain the changed dark current control mode based on the sent out control signal,
    wherein the controller is configured to send out the control signal to change the dark current control mode when the input signal of the RKE remote control is a vehicle unlocking input signal, and the vehicle unlocking input signal is input for a predetermined time period, and
    wherein the controller is configured to determine whether the dark current control mode is changed, and to change the dark current control mode based on a number of ignition On/Off switching cycles of a vehicle upon determination that the dark current control mode is not changed by the sent out signal to change the dark current control mode.

2. The apparatus for cutting off dark current according to claim 1, wherein the dark current control mode comprises:
    a first mode in which only load devices related to ignition of a vehicle consume power before the vehicle is delivered to a user; and
    a second mode in which the power is consumed by other load devices as well as the load devices related to the ignition of the vehicle after the vehicle is delivered to the user.

3. The apparatus for cutting off dark current according to claim 2, wherein the controller is configured to change the dark current control mode from the first mode to the second mode when the input signal of the RKE remote control satisfies the conditions for changing the dark current control mode.

4. The apparatus for cutting off dark current according to claim 3, wherein the switch comprises a toggle switch configured to maintain the changed second mode.

5. The apparatus for cutting off dark current according to claim 1, wherein the controller is configured to change the dark current control mode when the number of ignition On/Off switching cycles of the vehicle is greater than a predetermined number of times.

6. The apparatus for cutting off dark current according to claim 1, wherein the controller is configured to determine whether the ignition of a vehicle is on and whether the RKE remote control is located in the vehicle.

7. A vehicle comprising the apparatus for cutting off dark current according to claim 1.

8. A method of controlling an apparatus for cutting off dark current, the method comprising:
    receiving, by a controller, an input signal of a remote keyless entry (RKE) remote control from a body control module;
    determining, by the controller, whether the received input signal of the RKE remote control satisfies conditions for changing a dark current control mode of the apparatus for cutting off dark current;
    sending out, by the controller, a control signal to change the dark current control mode upon a determination that the input signal of the RKE remote control satisfies the conditions for changing the dark current control mode,
    determining, by the controller, whether the dark current control mode is changed; and
    changing, by the controller, the dark current control mode based on a number of ignition On/Off switching cycles of a vehicle when the dark current control mode is not changed by the sent out control signal to change the dark current control mode,
    wherein the control signal to change the dark current control mode is sent out when the received input signal of the RKE remote control is a vehicle unlocking input signal, and the vehicle unlocking input signal is input for a predetermined time period.

9. The method according to claim 8, wherein the changed dark current control mode is maintained based on the sent out control signal to change the dark current control mode.

10. The method according to claim 9, wherein the dark current control mode comprises:
    a first mode in which only load devices related to ignition of a vehicle consume power before the vehicle is delivered to a user; and
    a second mode in which the power is consumed by other load devices as well as the load devices related to the ignition of the vehicle after the vehicle is delivered to the user.

11. The method according to claim 10, wherein the dark current control mode is changed from the first mode to the second mode when the input signal of the RKE remote control satisfies the conditions for changing the dark current control mode.

12. The method according to claim 11, wherein the maintaining of the changed dark current control mode is performed by maintaining the changed second mode.

13. The method according to claim 8, wherein the dark current control mode is changed when the number of ignition On/Off switching cycles of the vehicle is greater than a predetermined number of times.

14. The method according to claim 8, further comprising:
    determining, by the controller, whether ignition of a vehicle is on; and
    determining, by the controller, whether the RKE remote control is located in the vehicle.

* * * * *